United States Patent
Uan-Zo-Li et al.

(10) Patent No.: US 9,787,188 B2
(45) Date of Patent: Oct. 10, 2017

(54) HIGH-FREQUENCY ON-PACKAGE VOLTAGE REGULATOR

(71) Applicant: INTEL CORPORATION, Santa Clara, CA (US)

(72) Inventors: Alexander Uan-Zo-Li, Hillsboro, OR (US); Don Nguyen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 162 days.

(21) Appl. No.: 14/316,147

(22) Filed: Jun. 26, 2014

(65) Prior Publication Data

US 2015/0381040 A1 Dec. 31, 2015

(51) Int. Cl.
*H02M 3/158* (2006.01)
*H02M 1/00* (2006.01)

(52) U.S. Cl.
CPC ........ *H02M 3/1584* (2013.01); *H02M 3/1588* (2013.01); *H02M 2001/0009* (2013.01); *Y02B 70/1466* (2013.01)

(58) Field of Classification Search
CPC ............... H02M 3/156; H02M 3/158; H02M 2001/0006; H02M 3/1588; H02M 3/1584; H02M 2001/0009
USPC .......................... 323/225, 272, 283–286, 350
See application file for complete search history.

(56) References Cited

U.S. PATENT DOCUMENTS

| | | | | |
|---|---|---|---|---|
| 6,465,993 B1 * | 10/2002 | Clarkin | ................. | H02M 3/156 323/272 |
| 7,002,325 B2 * | 2/2006 | Harris | ................. | H02M 3/1584 323/272 |
| 8,536,842 B2 * | 9/2013 | Prodi | .................... | H02M 3/157 323/272 |
| 2005/0093120 A1 | 5/2005 | Millik et al. | | |
| 2006/0152205 A1 * | 7/2006 | Tang | ................... | H02M 3/1584 323/284 |
| 2008/0129260 A1 * | 6/2008 | Abu Qahouq | ...... | H02M 3/1584 323/272 |

(Continued)

FOREIGN PATENT DOCUMENTS

| | | |
|---|---|---|
| JP | 2008017625 A | 1/2008 |
| JP | 2013094058 A | 5/2013 |
| JP | 2014072970 A | 4/2016 |

*Primary Examiner* — Kyle J Moody
(74) *Attorney, Agent, or Firm* — Stoel Rives LLP (57) ABSTRACT

An on-package voltage regulation system includes a platform controller hub (PCH), a driver metal-oxide-semiconductor field-effect transistor (DRMOS) control unit, and a plurality of inductors coupled to an output node. The PCH receives a voltage feedback signal corresponding to an output voltage at the output node, and outputs a control signal based on a difference between the voltage feedback signal and a reference voltage. The DRMOS control unit includes a plurality of switch transistors and a DRMOS controller. The switch transistors are coupled to the output node through the plurality of inductors. The DRMOS controller includes logic to determine an output current based on the control signal from the PCH, and to determine a distribution of the output current through the plurality of inductors. Transistor drivers control the switch transistors to share the output current through the plurality of inductors based on the determined output current and distribution.

18 Claims, 4 Drawing Sheets

(56) References Cited

U.S. PATENT DOCUMENTS

| | | | |
|---|---|---|---|
| 2010/0141230 A1* | 6/2010 | Lukic | H02M 3/1584 323/283 |
| 2010/0207594 A1* | 8/2010 | Davoudi | H02M 3/157 323/283 |
| 2012/0091977 A1* | 4/2012 | Carroll | H02M 3/1584 323/271 |
| 2013/0057240 A1* | 3/2013 | Zambetti | H02M 3/1584 323/271 |
| 2013/0082669 A1* | 4/2013 | Xu | G06F 1/28 323/271 |
| 2013/0169262 A1* | 7/2013 | Hartman | H02M 3/1584 323/351 |
| 2014/0077776 A1 | 3/2014 | Nguyen et al. | |
| 2014/0095897 A1 | 4/2014 | Ji et al. | |
| 2014/0132233 A1* | 5/2014 | Park | H02H 7/1213 323/272 |
| 2014/0210443 A1* | 7/2014 | Liu | H02M 3/1588 323/282 |

\* cited by examiner

HIGH-FREQUENCY ON-PACKAGE VOLTAGE REGULATOR

TECHNICAL FIELD

This disclosure relates to a voltage regulator for an electronic device.

BACKGROUND

Electronic devices, including mobile platforms such as smartphones, laptops or notebook computers, and tablet computers, continue to shrink in size. A power delivery system, including a core voltage regulator (VR) and charger, is often among the largest components of an electronic device (also referred to herein as a platform load, or simply as a platform). As electronic devices shrink in size, users also expect that power adapters will grow smaller and more portable. A challenge for mobile platform designs is to shrink the voltage regulators and the adapter, without negatively affecting the performance.

BRIEF DESCRIPTION OF THE DRAWINGS

Arrangements and embodiments may be described in detail with reference to the following drawings, in which like reference numerals refer to like elements and wherein.

DETAILED DESCRIPTION OF EMBODIMENTS

Embodiments and arrangements disclosed herein distribute logic within a high-frequency on-package voltage regulator to simplify the design, increase the efficiency, reduce the connections (e.g., solder bumps or joints), reduce the size, and/or reduce the cost of controlling the power stage.

One method to minimize or reduce the size and cost of platform voltage regulators is to use a high-frequency voltage regulator (HFVR) either on the system-on-a-chip (SOC) die or package. By way of example, and not by limitation, the switching frequency may be in a range of tens of MHz. However, skilled persons will recognize that higher or lower switching frequencies may be used. Using on-die or on-package HFVRs results in much fewer platform voltage regulators and a much smaller platform power delivery system. However, a problem with the on-die integrated solution is the relatively low scalability of the on-die voltage regulators. Further, on-package voltage regulators may require more silicon die because of the increased bump area used to control current sharing between multiple parallel phases, which becomes expensive.

Figure 1A:
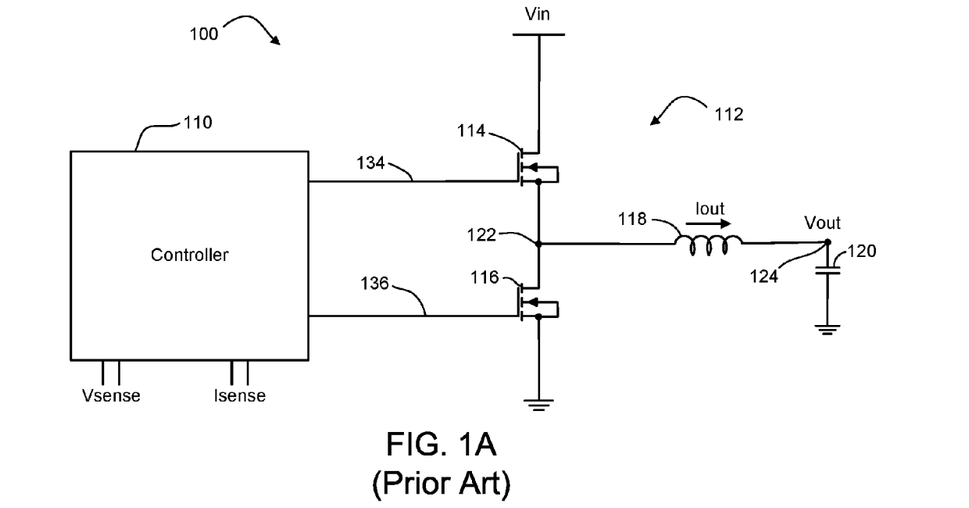
FIG. 1A is a block diagram of a voltage regulator including a controller electrically coupled to a buck converter.

For example, FIG. 1A is a block diagram of a traditional voltage regulator 100 including a controller 110 electrically coupled to a buck converter 112. The buck converter 112 includes a first switch transistor 114, a second switch transistor 116, an inductor 118, and a capacitor 120. Each of the first switch transistor 114 and the second switch transistor 116 may be a field effect transistor (FET). The first switch transistor 114 and the second switch transistor 116 are coupled in series between a direct current (DC) input voltage Vin and ground. A middle node 122 between the first switch transistor 114 and the second switch transistor 116 is coupled to a first end of the inductor 118. A second end of the inductor 118 is considered an output node 124 that provides an output voltage Vout to a platform load (or the electronic device). The capacitor 120 is coupled between the output node 124 and ground. The inductor 118 and the capacitor 120 form an output filter of the voltage regulator 100.

The buck converter 112 provides a current feedback signal Isense and a voltage feedback signal Vsense to the controller 110. The current feedback signal Isense is indicative of an output current Iout through the inductor 118. The voltage feedback signal Vsense is indicative of the output voltage Vout. The controller 110 uses the current and voltage feedback signals Isense and Vsense to control the buck converter 112 so as to generate a fixed or variable output voltage Vout of a selected magnitude that remains constant to within a desired tolerance regardless of changes to the input voltage Vin or load conditions. It is also possible to implement a "load line" with the output voltage drooping with the load increase. The controller 110 may also use the current feedback signal Isense to help protect the voltage regulator 100 from overcurrent conditions.

Figure 1B:
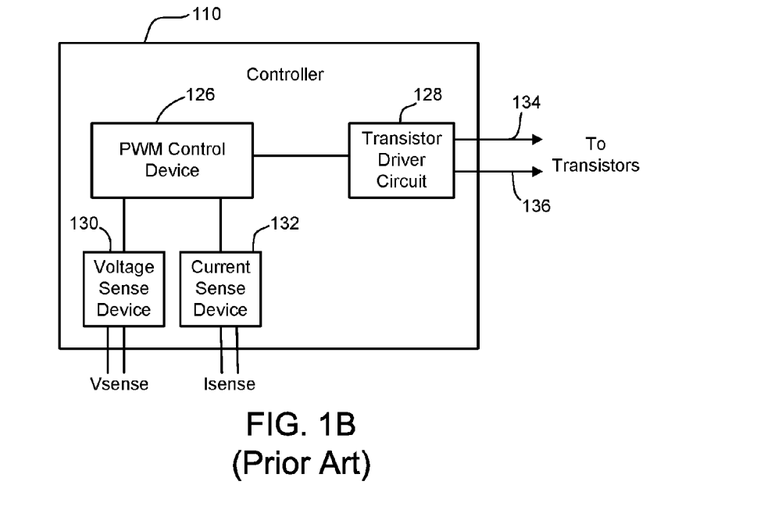
FIG. 1B is a block diagram of an example controller used by the voltage regulator shown in FIG. 1A.

FIG. 1B is a block diagram of an example controller 110 used by the voltage regulator 100 shown in FIG. 1A. The controller 110 includes a pulse width modulation (PWM) control device 126, a transistor driver circuit 128, a voltage sense device 130, and a current sense device 132. The voltage sense device 130 receives the voltage feedback signal Vsense indicative of the output voltage Vout. The current sense device 132 receives the current feedback signal Isense indicative of the output current Iout through the inductor 118. The voltage sense device 130 and the current sense device 132 provide output signals to the PWM control device 126. Devices 126, 130 and 132 may also contain compensation and filtering networks.

Based on the feedback signals Isense and Vsense, the PWM control device 126 generates pulse width modulation signals provided to the transistor driver circuit 128. The transistor driver circuit 128 provides driving signals 134, 136 to the first switch transistor 114 and the second switch transistor 116 of the buck converter 112 (as shown in FIGS. 1A and 1B). More specifically, the transistor driver circuit 128 provides the PWM signals to the first switch transistor 114 and the second switch transistor 116. A width of the PWM signals (or driving signals 134, 136) controls the timing of the first and second switch transistors 114, 116 to convert the input voltage Vin to the selected magnitude of the output voltage Vout at the output node 124.

If more than one phase is used, then the controller 110 may be coupled to a plurality of buck converters 112 (one for each phase) connected in parallel. Thus, the controller 110 includes as many pairs of driving signals 134, 136, as well as current monitoring and phase balancing inputs, as the number of phases.

Figure 2A:
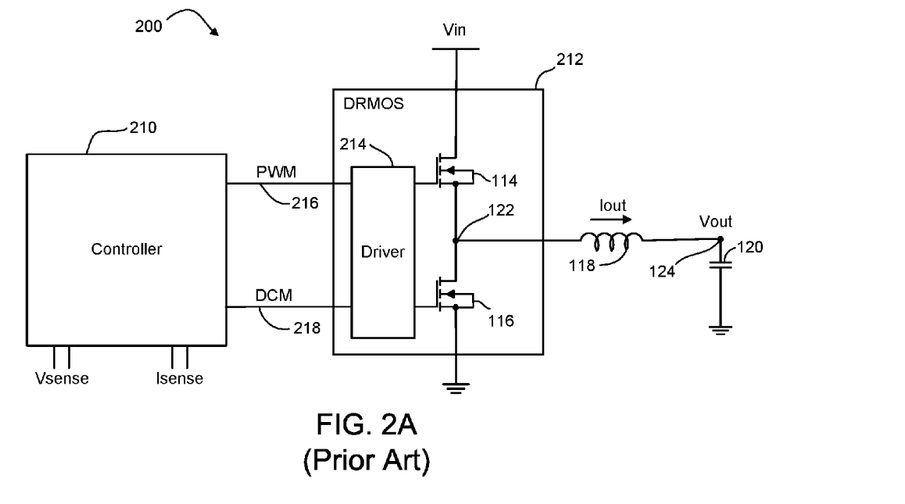
FIG. 2A is a block diagram of another voltage regulator that includes a controller electrically coupled to an integrated driver metal-oxide-semiconductor field-effect transistor (DRMOS)

FIG. 2A is a block diagram of another voltage regulator 200 that includes a controller 210 electrically coupled to an integrated driver metal-oxide-semiconductor field-effect transistor (DRMOS) 212. The DRMOS 212 includes switch transistors 114, 116 driven by driving signals from an integrated driver 214 (or FET driver 214). The voltage regulator 200 shown in FIG. 2A is similar to the voltage regulator 100 shown in FIG. 1A in that the controller 210 sets the switching frequency and generates PWM signals 216 to control when to switch the individual transistors 114, 116 based on feedback signals Isense and Vsense indicative of the output current Iout through the inductor 118 and the output voltage Vout, respectively. However, the controller 210 in FIG. 2A does not include the transistor driver circuit 128 shown in FIG. 1B. Rather, the controller in FIG. 2A provides the PWM signals 216 directly to the integrated driver 214 of the DRMOS 212. In the example shown in FIG. 2A, the controller 210 may also provide a discontinuous conduction mode (DCM) signal 218 to the DRMOS 212 to drive the switch transistors 114, 116 in a DCM mode.

Figure 2B:
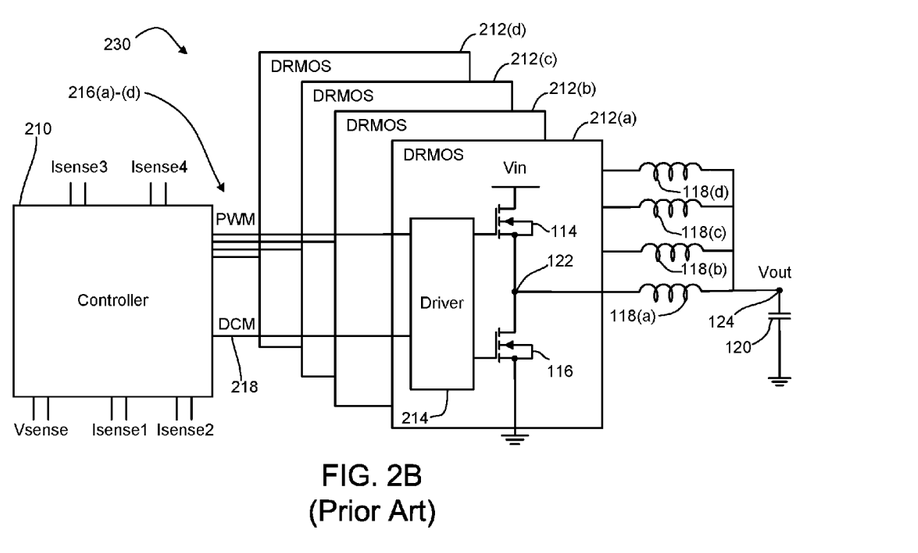
FIG. 2B is a block diagram of a multiphase voltage regulator that includes a controller electrically coupled to a plurality of DRMOS units and corresponding inductors connected in parallel.

FIG. 2B is a block diagram of a multiphase voltage regulator 230 that includes a controller 210 electrically coupled to a plurality of DRMOS units 212(*a*), 212(*b*), 212(*c*), 212(*d*) and corresponding inductors 118(*a*), 118(*b*), 118(*c*), 118(*d*) connected in parallel. In this example, four phases are used, however, persons skilled in the art will recognize that more or fewer phases may also be used. To provide current sharing and phase balancing, the controller 210 receives a current feedback signal Isense1, Isense2, Isense3, Isense4 for each output current through the respective inductors 118(*a*), 118(*b*), 118(*c*), 118(*d*) and provides separate PWM signals 216(*a*)-(*d*) to each DRMOS unit 212(*a*), 212(*b*), 212(*c*), 212(*d*). Thus, the number of connections or bumps increases for each phase controlled by the controller 210.

The inventors of the present application have recognized that the voltage regulator solutions shown in FIGS. 1A, 1B, 2A, and 2B may be too expensive and/or inefficient for certain on-package voltage regulator (OPVR) applications. For example, the inductance of an OPVR may be significantly smaller than the one normally used on a motherboard by nearly two orders of magnitude, which makes direct current resistance (DCR) sensing very difficult. Without accurate current information, the current sharing between the phases may be difficult or nearly impossible, which may be a problem for today's SOCs that consume high current and require multiple phases in parallel. Further, the DRMOS units 212(*a*), 212(*b*), 212(*c*), 212(*d*) shown in FIG. 2B may measure inductor current, but a special high frequency channel may be necessary to send this information to the controller 210. Moreover, as mentioned above, if the controller 210 is driving all phases, then an increased number of connections or bumps are used, which increases costs and decreases the OPVR efficiency, since every bump is costly in terms of money and efficiency loss. Also, it is useful for certain designs to use controllers that support a maximum phase count, which means either multiple controllers, or larger and more expensive controllers.

Thus, certain embodiments disclosed herein distribute logic within a high-frequency on-package voltage regulator such that, instead of relying on the controller (such as the controller 210 shown in FIGS. 2A, and 2B) for the PWM signal and current sharing, an integrated DRMOS controller provides the PWM signal and current sharing. Such embodiments provide a cheaper, simpler, and more efficient solution for high-frequency on-package voltage regulator.

Figure 3A:
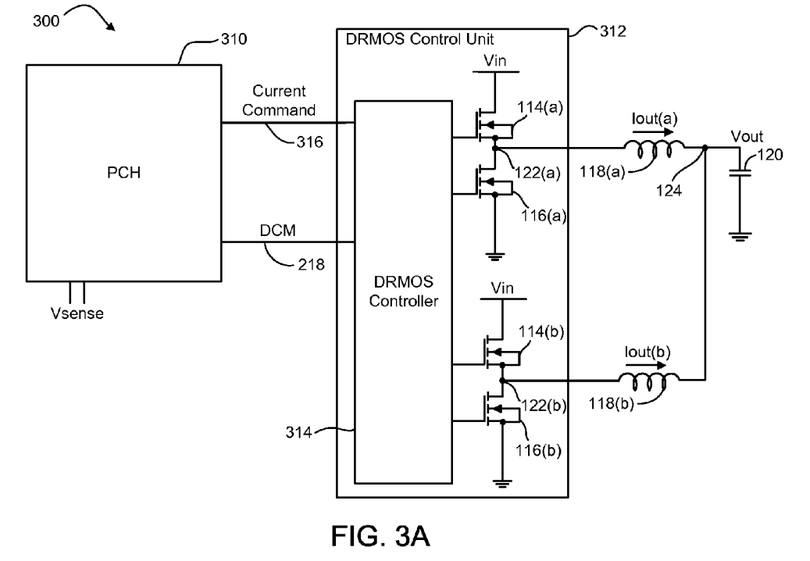
FIG. 3A is a block diagram of a voltage regulator according to one embodiment.

FIG. 3A is a block diagram of a voltage regulator 300 according to one embodiment. The voltage regulator 300 may be used, for example, as a high-frequency on-package voltage regulator. In other words, the voltage regulator 300 may be included on the package with the platform's central processing unit (CPU) or SOC. The voltage regulator 300 includes a platform controller hub (PCH) 310 electrically coupled to a DRMOS control unit 312. The DRMOS control unit 312 includes a DRMOS controller 314 integrated with a first pair of switch transistors 114(*a*), 116(*a*) and a second pair of switch transistors 114(*b*), 116(*b*). As discussed below, the DRMOS control unit 312 shown in FIG. 3A differs from the DRMOS 212 shown in FIG. 2A in several ways. For example, in addition to including the integrated FET drivers 214 shown in FIG. 2A, the DRMOS controller 314 shown in FIG. 3A also includes control logic to control the output current of all phases of the current commanded by the PCH 310.

In this example embodiment, the DRMOS control unit 312 is configured to provide two phases of current Iout(a) and Iout(b). Accordingly, the voltage regulator 300 includes a first inductor 118(*a*) coupled to the first pair of switch transistors 114(*a*), 116(*a*), and a second inductor 118(*b*) coupled to the second pair of switch transistors 114(*b*), 116(*b*). However, persons skilled in the art will recognize that other embodiments may include a single pair of transistors and a single inductor to provide a single current, or more than two pairs of transistors and more than two inductors to provide many phases.

Each of the first pair of switch transistors 114(*a*), 116(*a*) and the second pair of switch transistors 114(*b*), 116(*b*) may be a FET. The first pair of switch transistors 114(*a*), 116(*a*) is coupled in series between a DC input voltage Vin and ground. Similarly, the second pair of switch transistors 114(*b*), 116(*b*) is coupled in series between the DC input voltage Vin and ground. A first middle node 122(*a*) between the first pair of switch transistors 114(*a*), 116(*a*) is coupled to a first end of the first inductor 118(*a*), and a second middle node 122(*b*) between the second pair of switch transistor 114(*b*), 116(*b*) is coupled to a first end of the second inductor 118(*b*). A second end of the first inductor 118(*a*) and a second end of the second inductor 118(*b*) are electrically coupled to an output node 124 (e.g., output rail) that provides an output voltage Vout to a platform load (or the electronic device). The capacitor 120 is coupled between the output node 124 and ground. The inductors 118(*a*), 118(*b*) and the capacitor 120 form an output filter of the voltage regulator 300.

In certain embodiments, rather than using a separate power controller, such as the controllers 110, 210 shown in FIGS. 1A, 1B, 2A, and 2B, a platform's PCH 310 is used as the main controller for the OPVR power delivery. Generally, a PCH configured for a particular platform controls certain data paths and support functions used in conjunction with a CPU. The PCH may provide, for example, a system clock, a direct media interface with the CPU, and/or a flexible display interface (e.g., if supporting a processor with integrated graphics). In certain embodiments, the PCH 310 is on the same package as the CPU. In other embodiments, the PCH 310 is integrated on the same die as the CPU as part of the SOC. In the embodiment shown in FIG. 3A, however, the PCH 310 and the DRMOS control unit 312 are on the same package, but not on the same die, as one another. In such embodiments, the PCH 310 and the DRMOS control unit 312 may be provided by different entities or sources (e.g., manufacturers).

Figure 3B:
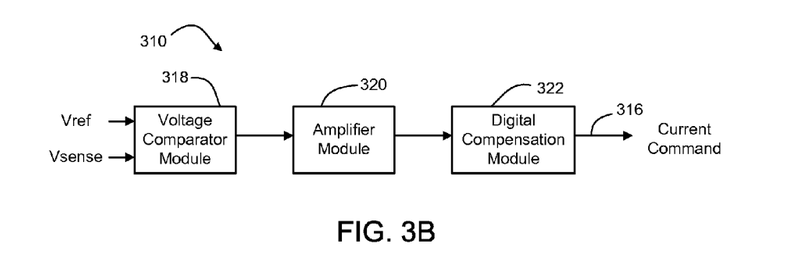
FIG. 3B is a block diagram of a platform controller hub (PCH) shown in FIG. 3A according to one embodiment.

As shown in FIG. 3A, the PCH 310 is used as the main controller for the OPVR power delivery. The PCH 310 uses its digital and analog circuitry to generate a current command 316 based on a voltage feedback signal Vsense that is indicative of the output voltage Vout at the output node 124. For example, FIG. 3B is a block diagram of the PCH 310 shown in FIG. 3A according to one embodiment. In the example shown in FIG. 3B, the PCH includes a voltage comparator module 318, an amplifier module 320, and a digital compensation module 322.

The voltage comparator module 318 compares the voltage feedback signal Vsense to a reference voltage Vref and outputs the voltage difference to the amplifier module 320. The amplifier module 320 amplifies the voltage difference (or voltage error) from the voltage comparator module 318 and provides the amplified signal to the digital compensation module 322. The digital compensation module 322 generates the current command 316 based on the voltage error. The PCH 310 communicates the current command 316 to the DRMOS controller 314 of the DRMOS control unit 312. In one embodiment, the current command 316 indicates to the DRMOS controller 314 the total current (e.g., Iout(a)+Iout(b)) to provide at the output node 124. However, the PCH 310 is not responsible for how the current should be shared and/or phase compensated among the different inductors 118(a), 118(b). Thus, in certain embodiments, current feedback signals indicative of the output currents through the individual inductors 118(a), 118(b) (such as the current feedback signals Isense1, Isense2, Isense3, and Isense4 shown in FIG. 2B) are not provided to the PCH 310.

In addition, or in other embodiments, the PCH 310 communicates with the SOC (not shown), e.g., through a serial voltage identification (SVID or I2C) bus, to selectively control a proper voltage regulator output voltage value, slew rates, and SOC mode of operation. For example, in sleep mode, the PCH 310 can send the DCM or low power signal 218 to the DRMOS controller 314, which allows DRMOS control unit 312 to enter into DCM mode and/or cut some of the phases.

In response to the current command 316, the DRMOS controller 314 of the DRMOS control unit 312 (which in certain embodiments has more than one phase) is configured to control the total output current of the phases (e.g., Iout(a)+Iout (b)) to the current commanded by the PCH 310. In certain embodiments, the DRMOS control unit 312 does not need to have high-accuracy, and the total output current may deviate from the actual value of the PCH's commanded current, because the PCH 310 uses the feedback loop to correct the value of the total current to maintain the proper output voltage Vout. The current command 316 may be considered as only a proxy for the output voltage Vout. In another embodiment, the current command 316 simply provides an indication of the voltage error between the voltage feedback signal Vsense and the reference voltage Vref, and the DRMOS controller 314 determines the total output current of the phases.

Figure 3C:
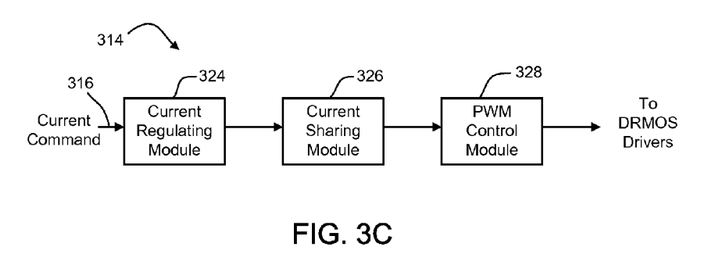
FIG. 3C is a block diagram of control logic included in the DRMOS controller shown in FIG. 3A according to one embodiment.

In certain embodiments, the DRMOS control unit 312 is also configured to provide and maintain current sharing and phase balancing between the different phase currents Iout(a) and Iout(b). For example, FIG. 3C is a block diagram of control logic included in the DRMOS controller 314 shown in FIG. 3A according to one embodiment. In this example, the control logic included in the DRMOS controller 314 includes a current regulating module 324, a current sharing module 326, and a PWM control module 328. Persons skilled in the art will recognize that not every module 324, 326, 328 is required in every embodiment. For example, the current sharing module 326 may not be used in embodiments using a single phase.

In the example shown in FIG. 3C, the current regulating module 324 receives the current command 316 from the PCH 310 and adjusts the settings of the DRMOS controller 314 to change the total current generated at the output node 124. The current regulating module 324 provides an indication of the adjusted settings and/or the changed total current to the current sharing module 326, which determines how to divide the current among the different phases. For example, depending on the particular application, the amplitude of the output current Iout(a) may be the same as that of the output current Iout(b), or the amplitude of the output current Iout(a) may be different than that of the output current Iout(b). As another example, the current sharing module 326 may also control the phase of the output current Iout(a) to be the same as, or different than, the phase of the output current Iout(b). Also, Iout(a) and Iout(b) may be kept at a certain ratio in order to support a "baby-buck" converter for one of the phases in order to achieve better light load efficiency.

In certain embodiments, although not shown in FIG. 3C, the current regulating module 324 and/or the current sharing module 326 may receive current feedback signals (e.g., Isense signals) indicative of the output currents Iout(a) and Iout(b) through the respective inductors 118(a), 118(b). Providing the current feedback signals to the current regulating module 324 and/or the current sharing module 326 may be useful, for example, when an error in the output current Iout(a) through the first inductor 118(a) is different than the error in the output current Iout(b) through the second inductor 118(b). In another example, the DRMOS controller 314 may measure the FET currents directly and use the measurements for better current sharing between the power stages. However, in embodiments where the errors in the output currents Iout(a), Iout(b) are about the same, the need to accurately provide the current feedback signals to the current regulating module 324 and/or the current sharing module 326 may be reduced or eliminated. Further, because the DRMOS control unit 312 measures the output currents Iout(a), Iout(b) used by the current regulating module 324 and/or the current sharing module 326, and only the voltage feedback signal Vsense is communicated to the PCH 310, it is not necessary to use a special high frequency channel to send the current feedback signals (Isense) to the PCH 310 or other on-package components.

Based on the output of the current sharing module 326 (or the current regulating module 324 if the current sharing module 326 is not used), the PWM control module 328 generates pulse width modulation signals provided to the transistor drivers (not shown) of the DRMOS controller 314. Like the transistor driver circuit 128 shown in FIG. 1B or the integrated driver 214 shown in FIG. 2A, the transistor drivers of the DRMOS controller 314 shown in FIG. 3A provide the PWM signals to the first pair of switch transistors 114(a), 116(a) and the second pair of switch transistors 114(b), 116(b). A width of the PWM signals controls the timing of the first pair of switch transistors 114(a), 116(a) and the second pair of switch transistors 114(b), 116(b).

The control logic included in the DRMOS controller 314 sets the PWM clock or the constant on-time. In certain embodiments, the feedback compensation is set up in the PCH 310 based on the switching frequency of DRMOS control unit 312. Thus, the PWM clock or constant on-time may be fine-tuned for a given switching frequency. In addition, or in other embodiments, the control logic included in the DRMOS controller 314 operates and recognizes the discontinuous conduction mode and provides overcurrent protection.

In certain embodiments, a plurality of DRMOS control units 312 may be used in parallel to support any number of phases. In addition, or in other embodiments, the PCH 310 may include the PWM clock, and may send a PWM signal (as well as the DCM if needed) to the DRMOS control unit 312.

Figure 4:
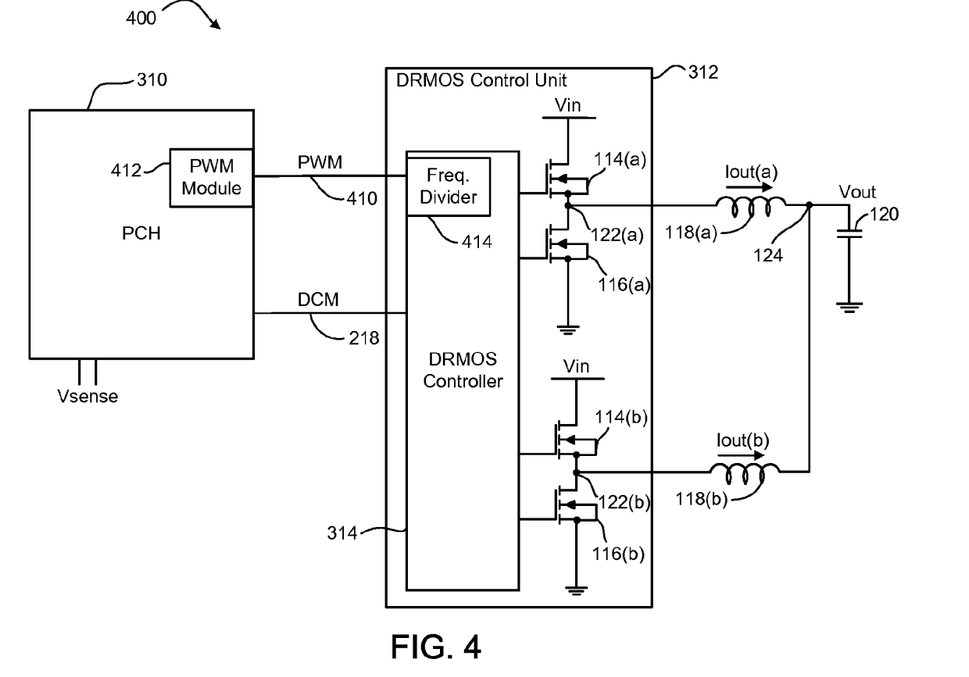
FIG. 4 is a block diagram of a voltage regulator that includes a PCH configured to provide a PWM command signal 410 to a DRMOS control unit according to one embodiment.

For example, FIG. 4 is a block diagram of a voltage regulator 400 that includes a PCH 310 configured to provide a PWM command signal 410 to a DRMOS control unit 312 according to one embodiment. The voltage regulator 400 may be used, for example, as a high-frequency on-package voltage regulator. In other words, the voltage regulator 400 may be included on the package with the platform's central processing unit (CPU) or SOC.

The DRMOS control unit 312 includes a DRMOS controller 314 integrated with a first pair of switch transistors 114(a), 116(a) and a second pair of switch transistors 114(b), 116(b). As discussed above with respect to FIG. 3A, the first pair of switch transistors 114(a), 116(a) and the second pair of switch transistors 114(b), 116(b) are respectively coupled to inductors 118(a), 118(b). Persons skilled in the art will recognize that other embodiments may include a single pair of transistors and a single inductor to provide a single phase, or more than two pairs of transistors and more than two inductors to provide many phases.

In FIG. 4, the PCH 310 includes a PWM module 412 with a clock used for on-package voltage regulation. The PCH 310 uses its digital and analog circuitry, including the PWM module 412, to generate the PWM command signal 410 that it provides to the DRMOS control unit 312. For example, certain embodiments of the PCH 310 shown in FIG. 4 use the voltage comparator module 318, the amplifier module 320, and the digital compensation module 322 shown in FIG. 3B with the PWM module 412 to generate the PWM command signal 410. As discussed above, the voltage comparator module 318 compares the voltage feedback signal Vsense to a reference voltage Vref and outputs the voltage difference to the amplifier module 320. The amplifier module 320 amplifies the voltage difference (or voltage error) from the voltage comparator module 318 and provides the amplified signal to the digital compensation module 322. The digital compensation module 322 provides digital compensation based on the voltage error. However, rather than outputting the current command 316 to the DRMOS control unit 312, the PWM module 412 uses the output of the digital compensation module 322 to generate the PWM command signal 410.

In addition, or in other embodiments, the PCH 310 communicates with the SOC (not shown), e.g., through an SVID bus, to selectively control a proper voltage regulator output voltage value, slew rates, and SOC mode of operation. For example, in sleep mode, the PCH 310 can send the DCM signal 218 to the DRMOS controllers, which allows the DRMOS control unit 312 to enter into DCM mode and/or cut some of the phases.

The PCH 310 in FIG. 4 uses the PWM command signal 410 to control the DRMOS control unit 312 as if it were a single phase power stage. The DRMOS controller 312 is responsible for frequency dividing the PWM command signal 410 and sharing the current between the phases. For example, the DRMOS controller 314 includes a frequency divider 414 to receive and split the PWM command signal 410 received from the PCH 310 into different phases. As discussed above with respect to FIG. 3C, the DRMOS control unit 312 is also configured to provide and maintain current sharing between the different phase currents Iout(a) and Iout(b).

In addition, or in other embodiments, the control logic included in the DRMOS controller 314 operates and recognizes the discontinuous conduction mode and provides overcurrent protection.

Certain embodiments disclosed herein allow for a relatively easy change of the number of phases from one design to another. In the embodiment shown in FIG. 3A, for example, some constant coefficients in the PCH 310 may be changed based on the number of phases. As another example, the clock frequency of the PWM module in the PCH 310 shown in FIG. 4 may be changed based on the number of phases. In addition, or in other embodiments disclosed herein, fewer bumps or connections may be used for an on-package voltage regulator using the DRMOS control unit, which means lower cost and higher efficiency.

Example Embodiments

The following examples pertain to further embodiments.

In Example 1, an on-package voltage regulation system includes a PCH, a plurality of inductors, and a DRMOS control unit. The PCH is configured to receive a voltage feedback signal corresponding to an output voltage at an output node of the on-package voltage regulation system, and to output a control signal based on a difference between the voltage feedback signal and a reference voltage. The plurality of inductors are coupled to the output node of the on-package voltage regulation system. The DRMOS control unit includes a plurality of switch transistors and a DRMOS control unit. The plurality of switch transistors are coupled to the output node through the plurality of inductors. The plurality of inductors are connected in parallel between the DRMOS control unit and the output node. The DRMOS controller includes logic and transistor drivers. The logic of the DRMOS controller is to determine an output current based on the control signal from the PCH, and to determine a distribution of the output current through the plurality of inductors. The transistor drivers are to control the switch transistors to share the output current through the plurality of inductors based on the determined output current and distribution.

Example 2 includes the on-package voltage regulation system of Example 1, wherein the logic of the DRMOS controller is further configured to determine relative phases of individual currents through the plurality of inductors, and wherein the transistor drivers are further configured to share the output current through the plurality of inductors based on the relative phases.

Example 3 includes the on-package voltage regulation system of Example 1, wherein the control signal from the PCH includes a current command.

Example 4 includes the on-package voltage regulation system of Example 3, wherein the PCH includes a voltage comparator module to compare the voltage feedback signal to the reference voltage, and to output a voltage error signal corresponding to the difference between the voltage feedback signal and the reference voltage. The PCH also includes a digital compensation module to generate the current command based on the voltage error.

Example 5 includes the on-package voltage regulation system of Example 4, wherein the PCH further includes an amplifier module to amplify the voltage error signal before providing the voltage error to the digital compensation module.

Example 6 includes the on-package voltage regulation system of Example 3, wherein the logic of the DRMOS controller includes a current regulating module to adjust one or more settings of the DRMOS controller to change the output current at the output node in response to the current command, a current sharing module to determine the distribution of the output current through the plurality of inductors based on the adjusted one or more settings, and a PWM control module to generate PWM signals provided to the transistor drivers. The transistor drivers switch the switch transistors based on the PWM signals.

Example 7 includes the on-package voltage regulation system of Example 1, wherein the control signal from the PCH includes a PWM command signal.

Example 8 includes the on-package voltage regulation system of Example 7, wherein the PCH includes a PWM module to generate the PWM command based on the difference between the voltage feedback signal and the reference voltage.

Example 9 includes the on-package voltage regulation system of Example 7, wherein the DRMOS controller includes a frequency divider to split the PWM command signal into different phases corresponding to individual currents through the plurality of inductors based on the determined distribution of the output current.

Example 10 includes the on-package voltage regulation system of Example 1, wherein the PCH generates the control signal without using a current feedback signal corresponding to the output current shared through the plurality of inductors.

Example 11 includes the on-package voltage regulation system of Example 1, wherein the plurality of switch transistors includes a first pair of switch transistors and a second pair of switch transistors. The first pair of switch transistors are electrically coupled in series between an input voltage and a ground. A first middle node between the first pair of switch transistors is electrically coupled to the output node of the on-package voltage regulation system through a first inductor of the plurality of inductors. The second pair of switch transistors is electrically coupled in series between the input voltage and the ground. A second middle node between the second pair of switch transistors is electrically coupled to the output node of the on-package voltage regulation system through a second inductor of the plurality of inductors.

Example 12 includes the on-package voltage regulation system of Example 11, wherein the transistor drivers are further configured to control the first pair of switch transistors and the second pair of switch transistors to generate a first portion of the output current through the first inductor and a second portion of the output current through the second inductor based on based on the determined output current and distribution.

In Example 13 a DRMOS control unit includes a first pair of switch transistors, a second pair of switch transistors, and DRMOS controller. The first pair of switch transistors is electrically coupled in series between an input voltage and a ground. A first middle node between the first pair of switch transistors provides a first current output. The second pair of switch transistors is electrically coupled in series between the input voltage and the ground. A second middle node between the second pair of switch transistors provides a second current output. The DRMOS controller is configured to determine a total output current based on a received control signal, and to determine a distribution of the total output current through the first current output and the second current output. The DRMOS controller includes transistor drivers to control the first pair of switch transistors and the second pair of switch transistors to generate a first portion of the total output current through the first current output and a second portion of the total output current through the second current output based on the determined output current and distribution.

Example 14 includes the DRMOS control unit of Example 13, wherein the DRMOS controller is further configured to determine relative phases of individual currents through the first current output and the second current output, and wherein the transistor drivers are further configured to control the relative phases of the individual currents.

Example 15 includes the DRMOS control unit of Example 13, wherein the control signal includes a current command.

Example 16 includes the DRMOS control unit of Example 15, wherein the DRMOS controller includes a current regulating module to adjust one or more settings of the DRMOS controller to change the total output current in response to the current command, a current sharing module to determine the distribution of the total output current through the first current output and the second current output, and PWM control module to generate PWM signals provided to the transistor drivers. The transistor drivers switch the switch transistors based on the PWM signals.

Example 17 includes the DRMOS control unit of Example 13, wherein the control signal includes a PWM command signal.

Example 18 includes the DRMOS control unit of Example 17, wherein the DRMOS controller includes a frequency divider to split the PWM command signal into different phases corresponding to individual currents through the first current output and the second current output.

In Example 19, an IC package includes an IC die, a PCH, and a voltage regulator. The IC die includes a CPU or SOC. The PCH is to control at least one data path and support function of the CPU or SOC, and to output a control signal based on voltage feedback at a node electrically coupled to the IC die. The voltage regulator is to provide a regulated voltage at the node electrically coupled to the IC die. The voltage regulator includes means for sharing current between a plurality of phased outputs coupled to the node, and means for driving the plurality of phased outputs in response to the control signal from the PCH.

Example 20 includes the IC package of Example 19, wherein the control signal includes a current command based on the voltage feedback, and wherein the means for sharing the current further includes means for generating one or more PWM signals in response to the current command.

Example 21 includes the IC package of Example 19, wherein the control signal includes a single PWM signal, and wherein the means for sharing the current further includes means for frequency dividing the PWM signal for each of the plurality of phased outputs.

In Example 22, an apparatus includes first switching means for providing a first output current, second switching means for providing a second current output, and controlling means. The controlling means is for determining a total output current based on a received control signal, determining a distribution of the total output current through the first output current and the second output current, and driving the first switching means and the second switching means to generate a first portion of the total output current through the first output current and a second portion of the total output current through the second output current based on the determined output current and distribution.

Example 23 includes the apparatus of Example 22, wherein the controlling means is further for determining relative phases of individual currents through the first output current and the second output current, and controlling the relative phases of the individual currents.

Example 24 includes the apparatus of any of Examples 22-23, wherein the control signal includes a current command.

Example 25 includes the apparatus of Example 24, wherein the controlling means is further for adjusting one or more settings to change the total output current in response to the current command, determining the distribution of the total output current through the first output current and the second output current, and generating PWM signals for driving the first switching means and the second switching means.

Example 26 includes the apparatus of any of Examples 22-23, wherein the control signal includes a PWM command signal.

Example 27 includes the apparatus of Example 26, wherein the controlling means is further for splitting the PWM command signal into different phases corresponding to individual currents through the first output current and the second output current.

In Example 28, a method is provided for voltage regulation on or in an IC package including a CPU or SOC. The method includes determining, on or in IC package, a total output current based on a control signal received from a PCH on or in the IC package, determining, on or in IC package, a distribution of the total output current through a first output current and a second output current, and driving, on or in IC package and based on the determined output current and distribution, a first pair of switch transistors to generate a first portion of the total output current and a second pair of switch transistors to generate a second portion of the total output current.

Example 29 includes the method of Example 28, and further includes determining relative phases of individual currents through the first output current and the second output current, and controlling the relative phases of the individual currents.

Example 30 includes the method of any of Examples 28-29, wherein the control signal includes a current command.

Example 31 includes the method of Example 30, and further includes adjusting one or more settings to change the total output current in response to the current command, determining the distribution of the total output current through the first output current and the second output current, and generating PWM signals for driving the first pair of switch transistors and the second pair of switch transistors.

Example 32 includes the method of any of Examples 28-29, wherein the control signal includes a PWM command signal.

Example 33 includes the method of Example 32, wherein the controlling means is further for splitting the PWM command signal into different phases corresponding to individual currents through the first output current and the second output current.

In Example 34, a PCH is configured for on-package voltage regulation. The PCH includes an input to receive a voltage feedback signal corresponding to an output voltage at an output node of the on-package voltage regulation system, a voltage comparator module, an amplifier module, and a digital compensation module. The voltage comparator module is to compare the voltage feedback signal to a reference voltage, and to output a voltage error signal corresponding to the difference between the voltage feedback signal and the reference voltage. The amplifier module is to amplify the voltage error signal. The digital compensation module is to generate a control signal based on the amplified voltage error signal.

Example 35 includes the PCH of Example 34, wherein the control signal from the PCH includes a current command.

Example 36 includes the PCH of Example 34, wherein the control signal from the PCH includes a PWM command signal.

Example 37 includes the PCH of Example 36, and further includes a PWM module to generate the PWM command based on the difference between the voltage feedback signal and the reference voltage.

Example 38 includes the PCH of any of Examples 34-37, wherein the PCH generates the control signal without using a current feedback signal corresponding to the output voltage at an output node of the on-package voltage regulation system.

In Example 39, a machine readable storage includes machine-readable instructions to, when executed, implement a method or realize a PCH as recited in any of Examples 28-38.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. An on-package voltage regulation system, comprising:
a first semiconductor die of a package including a platform controller hub (PCH) to:
receive a voltage feedback signal corresponding to an output voltage at an output node of the on-package voltage regulation system; and
output a single control signal indicating a total output current of a plurality of current phases combined at the output node; and
a second semiconductor die of the package separate from the first semiconductor die, the second semiconductor die including:
a plurality of inductors coupled to the output node of the on-package voltage regulation system; and
a driver metal-oxide-semiconductor field-effect transistor (DRMOS) control unit comprising:
a plurality of switch transistors coupled to the output node through the plurality of inductors, the plurality of inductors connected in parallel between the DRMOS control unit and the output node; and
a DRMOS controller comprising:
logic to determine the total output current based on the single control signal from the PCH, and to determine a distribution of the plurality of current phases through the plurality of inductors to produce the total output current at the output node; and
transistor drivers to control the plurality of switch transistors to share the plurality of current phases through the plurality of inductors based on the determined total output current and distribution;
wherein the PCH generates the single control signal without using a current feedback signal corresponding to the output current shared through the plurality of inductors.

2. The on-package voltage regulation system of claim 1, wherein the logic of the DRMOS controller is further configured to determine relative phases of the plurality of current phases through the plurality of inductors, and wherein the transistor drivers are further configured to share the total output current through the plurality of inductors based on the relative phases.

3. The on-package voltage regulation system of claim 1, wherein the single control signal from the PCH comprises a current command.

4. The on-package voltage regulation system of claim 3, wherein the PCH comprises:
a voltage comparator module to compare the voltage feedback signal to the reference voltage, and to output a voltage error signal corresponding to the difference between the voltage feedback signal and the reference voltage; and
a digital compensation module to generate the current command based on the voltage error.

5. The on-package voltage regulation system of claim 4, wherein the PCH further comprises:
an amplifier module to amplify the voltage error signal before providing the voltage error to the digital compensation module.

6. The on-package voltage regulation system of claim 3, wherein the logic of the DRMOS controller comprises:
a current regulating module to adjust one or more settings of the DRMOS controller to change the total output current at the output node in response to the current command;
a current sharing module to determine the distribution of the total output current through the plurality of inductors based on the adjusted one or more settings; and
a pulse width modulation (PWM) control module to generate PWM signals provided to the transistor drivers, wherein the transistor drivers switch the plurality of switch transistors based on the PWM signals.

7. The on-package voltage regulation system of claim 1, wherein the single control signal from the PCH comprises a pulse width modulation (PWM) command signal.

8. The on-package voltage regulation system of claim 7, wherein the PCH comprises:
a PWM module to generate the PWM command signal based on the difference between the voltage feedback signal and the reference voltage.

9. The on-package voltage regulation system of claim 7, wherein the DRMOS controller includes a frequency divider to split the PWM command signal into different phases corresponding to the plurality of current phases through the plurality of inductors based on the determined distribution of the output current.

10. The on-package voltage regulation system of claim 1, wherein the plurality of switch transistors comprises:
a first pair of switch transistors electrically coupled in series between an input voltage and a ground, a first middle node between the first pair of switch transistors electrically coupled to the output node of the on-package voltage regulation system through a first inductor of the plurality of inductors; and
a second pair of switch transistors electrically coupled in series between the input voltage and the ground, a second middle node between the second pair of switch transistors electrically coupled to the output node of the on-package voltage regulation system through a second inductor of the plurality of inductors.

11. The on-package voltage regulation system of claim 10, wherein the transistor drivers are further configured to control the first pair of switch transistors and the second pair of switch transistors to generate a first portion of the output current through the first inductor and a second portion of the output current through the second inductor based on the determined total output current and distribution.

12. The on-package voltage regulation system of claim 1, wherein the first semiconductor die includes a central processing unit (CPU) powered by the DRMOS control unit.

13. The on-package voltage regulation system of claim 1, further comprising a central processing unit (CPU) of a semiconductor die of the package, the semiconductor die separate from the first semiconductor die, the CPU powered by the DRMOS control unit.

14. A driver metal-oxide-semiconductor field-effect transistor (DRMOS) control unit, comprising:
- a first pair of switch transistors of a first semiconductor die and electrically coupled in series between an input voltage and a ground, a first middle node between the first pair of switch transistors providing a first current output;
- a second pair of switch transistors of the first semiconductor die and electrically coupled in series between the input voltage and the ground, a second middle node between the second pair of switch transistors providing a second current output; and
- a DRMOS controller of the first semiconductor die and configured to determine a total output current based on a received single control signal, and to determine a distribution of the total output current through the first current output and the second current output, the DRMOS controller comprising:
  - transistor drivers to control the first pair of switch transistors and the second pair of switch transistors to generate a first portion of the total output current through the first current output and a second portion of the total output current through the second current output based on the determined output current and distribution;

wherein the DRMOS controller is configured to receive the received single control signal from a platform controller hub PCH of a second semiconductor die that is separate from the first semiconductor die.

15. The DRMOS control unit of claim 14, wherein the DRMOS controller is further configured to determine relative phases of individual currents through the first current output and the second current output, and wherein the transistor drivers are further configured to control the relative phases of the individual currents.

16. The DRMOS control unit of claim 14, wherein the single control signal comprises a current command.

17. The DRMOS control unit of claim 16, wherein the DRMOS controller comprises:
- a current regulating module to adjust one or more settings of the DRMOS controller to change the total output current in response to the current command;
- a current sharing module to determine the distribution of the total output current through the first current output and the second current output; and
- a pulse width modulation (PWM) control module to generate PWM signals provided to the transistor drivers, wherein the transistor drivers switch the switch transistors based on the PWM signals.

18. The DRMOS control unit of claim 14, wherein the DRMOS controller includes a frequency divider to split a PWM command signal into different phases corresponding to individual currents through the first current output and the second current output.

* * * * *